US011318873B2

(12) United States Patent
Ozawa et al.

(10) Patent No.: US 11,318,873 B2
(45) Date of Patent: May 3, 2022

(54) HEADREST SUPPORT STRUCTURE AND VEHICLE SEAT

(71) Applicant: Adient Engineering and IP GmbH, Burscheid (DE)

(72) Inventors: Motohiko Ozawa, Kanagawa (JP); Thomas D Novitsky, Plymouth, MI (US)

(73) Assignee: Adient US LLC, Plymouth, MI (US)

( * ) Notice: Subject to any disclaimer, the term of this patent is extended or adjusted under 35 U.S.C. 154(b) by 44 days.

(21) Appl. No.: 16/827,899

(22) Filed: Mar. 24, 2020

(65) Prior Publication Data

US 2021/0300222 A1 Sep. 30, 2021

(51) Int. Cl.
*B60N 2/897* (2018.01)
*B60N 2/809* (2018.01)

(52) U.S. Cl.
CPC ............ *B60N 2/897* (2018.02); *B60N 2/809* (2018.02)

(58) Field of Classification Search
CPC ................................ B60N 2/897; B60N 2/809
See application file for complete search history.

(56) References Cited

U.S. PATENT DOCUMENTS

| 5,788,250 | A  | * | 8/1998  | Masters | B60N 2/826 |
|           |    |   |         |         | 297/410 |
| 6,641,219 | B2 | * | 11/2003 | Meshke  | B60N 2/809 |
|           |    |   |         |         | 297/391 |
| 6,742,846 | B1 | * | 6/2004  | Isaacson | B60N 2/815 |
|           |    |   |         |         | 297/410 |
| 6,948,773 | B2 | * | 9/2005  | Yetukuri | B60N 2/80 |
|           |    |   |         |         | 297/410 |
| 7,410,219 | B2 | * | 8/2008  | Kraft   | B60N 2/809 |
|           |    |   |         |         | 297/410 |
| 2020/0039403 | A1 | * | 2/2020 | Onuma  | B60N 2/682 |

FOREIGN PATENT DOCUMENTS

| DE | 102019209013 A1 | * | 1/2020 | ............. B60N 2/897 |
| JP | H08-214987 A | | 8/1996 | |
| WO | WO-2017216138 A1 | * | 12/2017 | ............. B60N 2/809 |

* cited by examiner

*Primary Examiner* — David R Dunn
*Assistant Examiner* — Tania Abraham
(74) *Attorney, Agent, or Firm* — Marshall & Melhorn, LLC

(57) ABSTRACT

A headrest support structure has an upper panel, a collar and a sleeve. The upper panel extends in a width direction of a seatback frame at the upper part. The upper panel has a sleeve support part including upper and lower wall parts facing in a direction perpendicular to the width direction. The sleeve support part is in a U-shape open to a side opposite to a seating side in a longitudinal sectional shape. The upper and lower wall parts have upper and lower holes. The collar is in a tubular shape with a through hole. The collar is arranged between the upper wall part and the lower wall part to have the through hole communicate with the upper and lower holes. The sleeve is inserted through the upper hole, the through hole, and the lower hole. A rod-like leg portion of a headrest is insertable in the sleeve.

2 Claims, 4 Drawing Sheets

HEADREST SUPPORT STRUCTURE AND VEHICLE SEAT

FIELD OF THE INVENTION

The present invention relates to a headrest support structure and a vehicle seat provided with the same.

BACKGROUND OF THE INVENTION

Japanese Patent Application Publication No. 08-214987 discloses a vehicle seat including a seatback frame formed by a panel frame instead of a pipe frame for weight reduction, and a headrest support portion configured by joining the panel frame with a support bracket to be in a U-shape open to the rear side in a longitudinal sectional shape.

SUMMARY OF THE INVENTION

When a vehicle seat (hereinafter, simply referred to as a seat) is a front seat of a vehicle, a headrest support portion formed in a U-shape open to the rear side in a longitudinal sectional shape as described above is desirable because the resulting space can accommodate various units, such as an image display device, available for an occupant in the rear seat.

In this case, an upper wall and a lower wall constituting the U-shape have concentric holes formed therein, and sleeves in which rod-shaped leg portions of a headrest are put are inserted through both the holes.

However, in this structure, when a large rearward force is applied to the headrest by an occupant's head during vehicle collision or the like, the sleeves are easy to tilt greatly due to bending and deforming with the rear end of the upper wall going downward to reduce the vertical distance of the U-shaped opening.

Accordingly, when the rearward force applied to the headrest is extremely large, there is no denying that excessive bending deformation of the upper wall may cause the headrest to tilt rearward significantly, leaving room for improvement.

An object of the present invention is to provide a headrest support structure and a vehicle seat to well restrict the deformation of the headrest support portion when a rearward force is applied to the headrest to prevent the headrest from tilting rearward greatly.

A headrest support structure according to one aspect of the present invention includes an upper panel extending in a width direction of a seatback frame at an upper part of the seatback frame, the upper panel including a sleeve support part including an upper wall part and a lower wall part facing each other in a direction perpendicular to the width direction, the sleeve support part being formed in a U-shape open to a side opposite to a seating side in a longitudinal sectional shape, the upper wall part having an upper hole formed therein, the lower wall part having a lower hole formed therein at a position corresponding to the upper hole, a collar in a tubular shape with a through hole, the collar being arranged between the upper wall part and the lower wall part to have the through hole communicate with the upper hole and the lower hole, and a sleeve in which a rod-like leg portion of a headrest is insertable, the sleeve being inserted through the upper hole, the through hole, and the lower hole from above.

A vehicle seat according to another aspect of the present invention includes a cushion seat, a seatback with a seatback frame and a headrest support structure, and a headrest mounted on the headrest support structure, the headrest support structure including an upper panel extending in a width direction of the seatback frame at an upper part of the seatback frame, the upper panel including a sleeve support part including an upper wall part and a lower wall part facing each other in a direction perpendicular to the width direction, the sleeve support part being formed in a U-shape open to a side opposite to a seating side in a longitudinal sectional shape, the upper wall part having an upper hole formed therein, the lower wall part having a lower hole formed therein at a position corresponding to the upper hole, a collar in a tubular shape with a through hole, the collar being arranged between the upper wall part and the lower wall part to have the through hole communicate with the upper hole and the lower hole, and a sleeve in which a rod-like leg portion of the headrest is insertable, the sleeve being inserted through the upper hole, the through hole, and the lower hole from above.

In accordance with an embodiment of the present invention, the deformation of the headrest support portion is well restricted when a rearward force is applied to the headrest to prevent the headrest from tilting rearward greatly.

DETAILED DESCRIPTION OF THE INVENTION

A vehicle seat according to an embodiment of the present invention is described with reference to a headrest support structure HK and a seat ST provided with the headrest support structure HK as an example.

Figure 1:
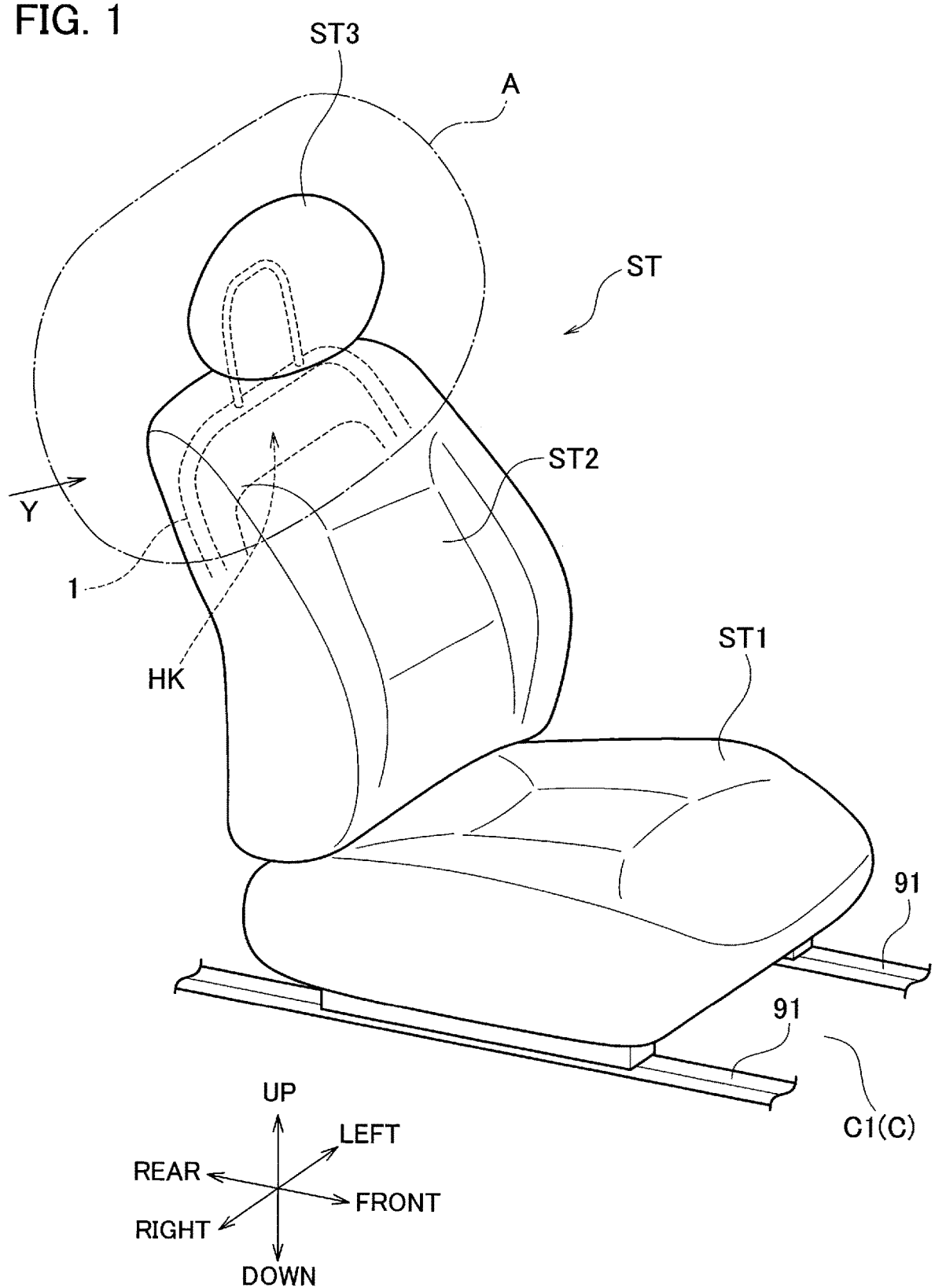
FIG. 1 is a perspective view of a seat ST as an example of a vehicle seat according to an embodiment of the present invention.

FIG. 1 is an exterior perspective view of the seat ST. In the following description, the front, rear, left, right, up, and down directions are defined by arrows shown in FIG. 1 according to a state of the seat ST mounted on a vehicle C. The left and right directions are also referred to as width directions.

As shown in FIG. 1, the seat ST includes a cushion seat ST1, a seatback ST2, and a headrest ST3.

The seat ST is mounted to be movable back and forth by a known slide structure with respect to a pair of rails 91, 91 installed on a floor Cl of the vehicle C as a fixing member.

A seatback frame 1 housed within the seatback ST2 includes the headrest support structure HK at the upper part. The headrest support structure HK includes a support portion HS to support the headrest ST3. The headrest ST3 is attachable to and detachable from the support portion HS from above.

Next, the support portion HS is described with reference to FIGS. 2 to 4.

Figure 2:
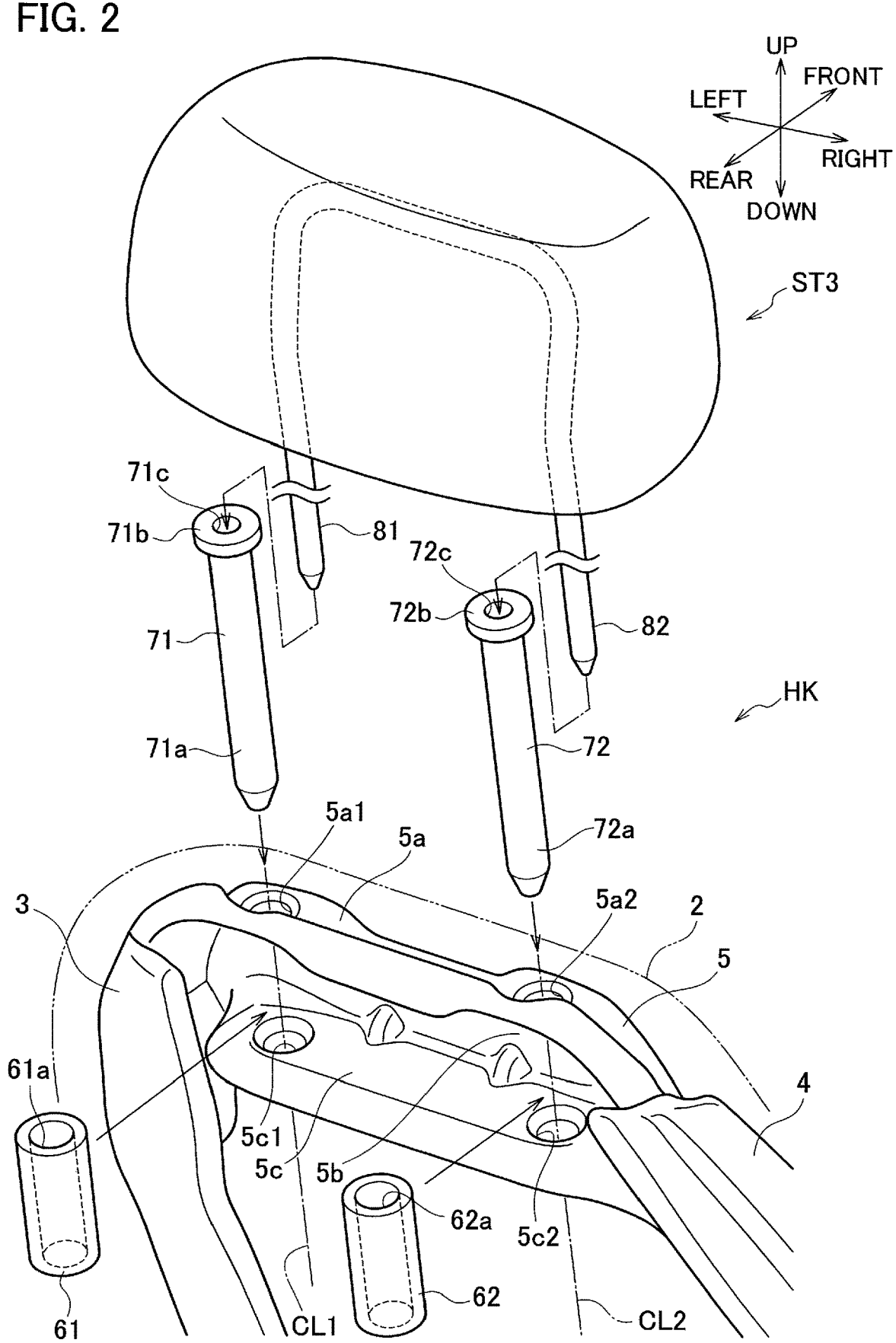
FIG. 2 is an assembly diagram illustrating a support portion HS in the seat ST.

FIG. 2 is an assembly diagram of the upper part of the seatback ST2 as viewed from diagonally above the right rear (arrow view Y of FIG. 1).

Figure 3:
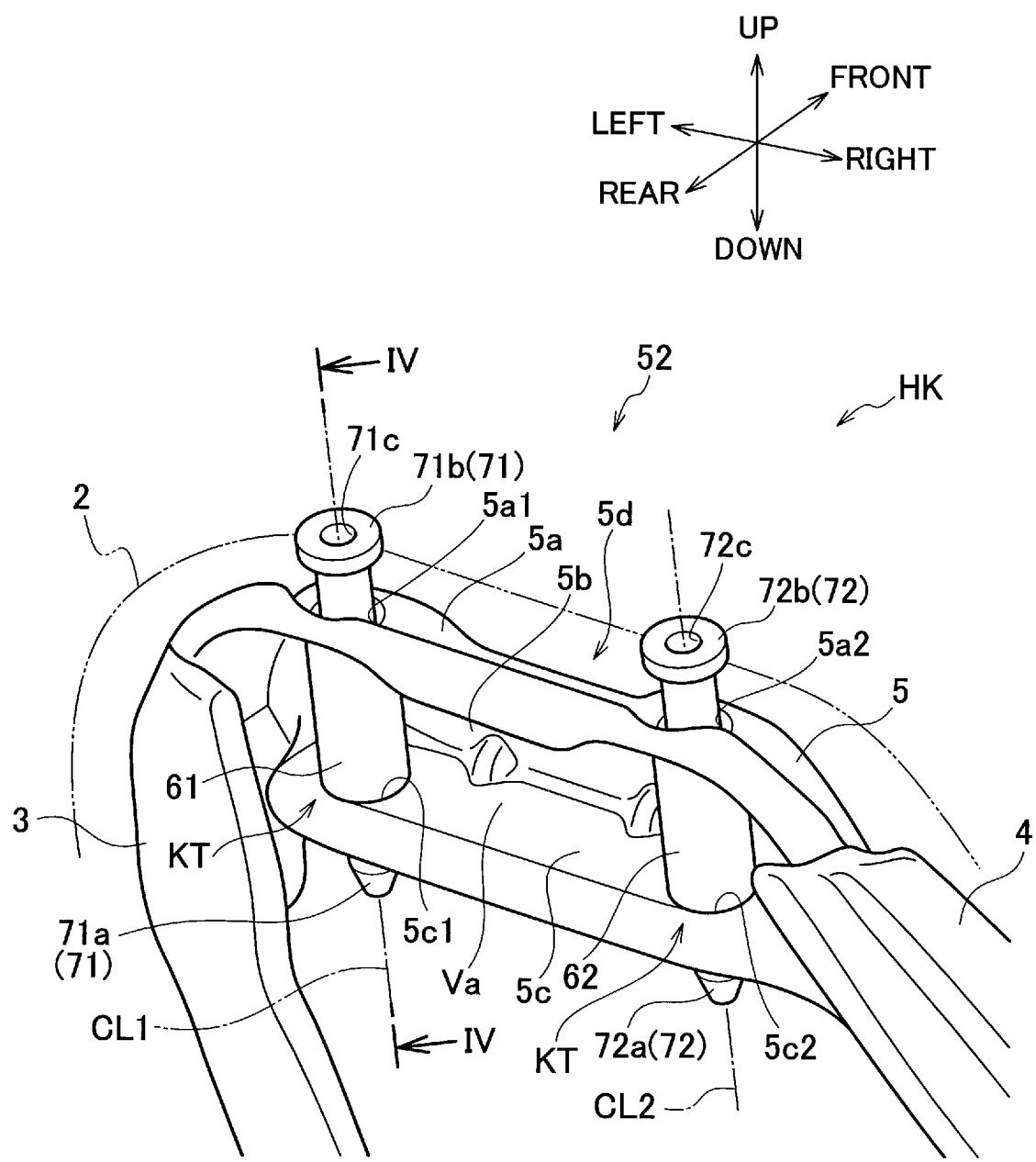
FIG. 3 is a perspective view of a headrest support structure HK, illustrating the support portion HS with a headrest ST3 removed.

FIG. 3 is a perspective view of the seatback ST2 with the headrest ST3 removed as viewed from diagonally above the same right rear as FIG. 2.

Figure 4:
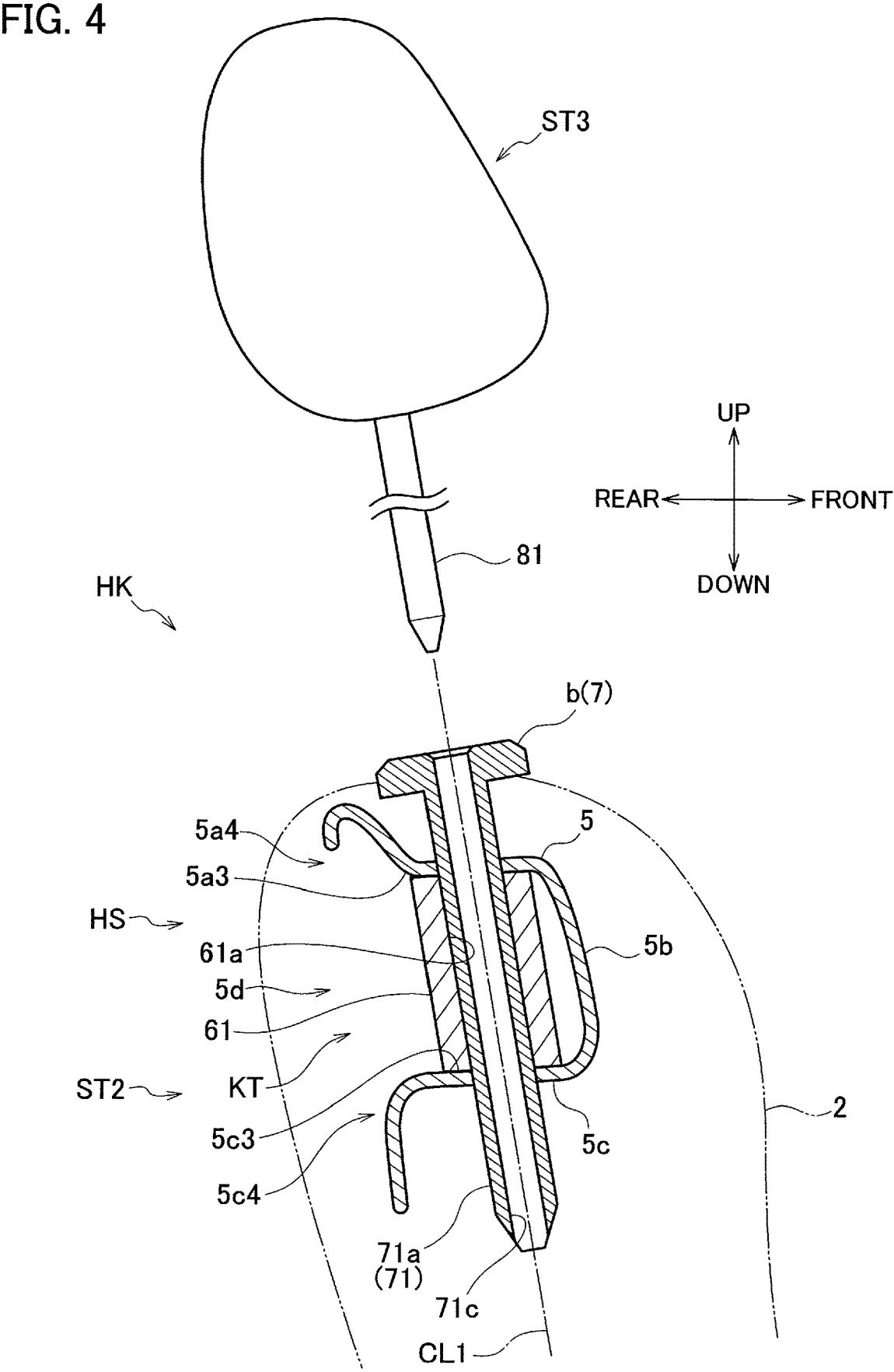
FIG. 4 is a sectional view of the headrest support structure HK taken along line IV-IV of FIG. 3.

FIG. 4 is a sectional view of the seatback ST2 with the headrest ST3 taken along the line IV-IV of FIG. 3.

FIGS. 2 to 4 illustrate an external form of a cushion body 2 wrapping the seatback frame 1 by two-dot chain lines.

The seatback frame 1 is formed as a panel frame, not as a pipe frame.

The seatback frame 1 includes a left side panel 3 and a right side panel 4 each extending in the up and down directions at the left and right sides of the seat back ST2 in a normal posture.

The left side panel 3 and the right side panel 4 are connected and unified at the upper part by an upper panel 5 extending in the left and right directions.

As shown in FIG. 4, the upper panel 5 includes a sleeve support part 5d formed in a U-shape open to the rear side opposite to the occupant's seating side in a longitudinal sectional shape. The longitudinal sectional shape here means a sectional shape along a longitudinal direction extending from the root to the end of the seatback ST2.

In particular, the upper panel 5 includes the sleeve support part 5d that includes an upper wall part 5a extending in the front, rear, left, and right directions at the upper part, a front wall part 5b extending from the front end of the upper wall part 5a diagonally downward and forward in the up, down, left, and right directions, and a lower wall part 5c extending from the lower end of the front wall part 5b rearward in the front, rear, left, and right directions.

The upper wall part 5a and the lower wall part 5c are generally formed parallel, for example.

The upper wall part 5a has a pair of an upper hole 5a1 and an upper hole 5a2 formed therein. The upper hole 5a1 and the upper hole 5a2 are separated from each other in the left and right directions.

The lower wall part 5c has a lower hole 5c1 and a lower hole 5c2 formed therein at positions corresponding to the upper hole 5a1 and the upper hole 5a2, respectively.

More specifically, an axial line CL1 penetrating the upper hole 5a1 and the lower hole 5c1, and an axial line CL2 penetrating the upper hole 5a2 and the lower hole 5c2 and generally being parallel to the axial line CL1 can be defined.

The upper panel 5 has a collar 61 arranged on the axial line CL1 and a collar 62 arranged on the axial line CL2 between the upper wall part 5a and the lower wall part 5c. The collar 61 is a tubular member with a through hole 61a, and the collar 62 is a tubular member with a through hole 62a.

The collar 61 is arranged to have the through hole 61a communicate with the upper hole 5a1 and the lower hole 5c1.

The collar 62 is arranged to have the through hole 62a communicate with the upper hole 5a2 and the lower hole 5c2.

As shown in FIG. 4, the collars 61, 62 each have the top end surface and the bottom end surface abut on a bottom surface 5a3 of the upper wall part 5a and a top surface 5c3 of the lower wall part 5c, or face closely to the bottom surface 5a3 and the top surface 5c3 with a slight gap.

The collars 61, 62 are formed of a metal or a hard resin and have high bending rigidity and compression rigidity.

With the collar 61 arranged on the axial line CL1, a base part 71a of a sleeve 71 is inserted from above to penetrate the upper hole 5a1 of the upper wall part 5a, the through hole 61a of the collar 61, and the lower hole 5c1 of the lower wall part 5c.

The sleeve 71 includes the base part 71a in a ring shape extending in the up and down directions, and a flange part 71b formed on the upper end of the base part 71a and projecting radially outward.

Similarly, on the axial line CL2, a sleeve 72 of substantially the same shape as the sleeve 71 is inserted from above to penetrate the upper hole 5a2, the through hole 62a of the collar 62, and the lower hole 5c2.

The sleeve 71 has a through hole 71c penetrating the base part 71a and the flange part 71b. The sleeve 72 has a through hole 72c penetrating a base part 72a and a flange part 72b.

The sleeves 71, 72 are formed of resin, for example.

The support portion HS of the headrest support structure HK included in the seat ST is configured to include the above-described upper panel 5, the collars 61, 62, and the sleeves 71, 72.

The headrest ST3 includes a pair of projecting rod-shaped leg portions 81, 82. The headrest ST3 is mounted on or removed from the seatback ST2 by inserting or removing the rod-shaped leg portions 81, 82 into or from the through holes 71c, 72c of the sleeves 71, 72, respectively, by an occupant or the like.

Moreover, for example, the sleeve 71 is provided with a not-shown lock mechanism to lock the inserted rod-shaped leg portion 81 to prevent its falling out.

As described above, in the headrest support structure HK and the seat ST provided with the same, the headrest ST3 is not supported only by the sleeves 71, 72, in which the rod-shaped leg portions 81, 82 are inserted, with respect to the upper panel 5 of the seatback frame 1.

That is, in the headrest support structure HK and the seat ST provided with the same, the headrest ST3 is supported by both the members of the sleeves 71, 72, in which the rod-shaped leg portions 81, 82 are inserted, and the high rigidity collars 61, 62, in which the sleeves 71, 72 are inserted, with respect to the upper panel 5 of the seatback frame 1.

Accordingly, the sleeves 71, 72 and the collars 61, 62 in which the sleeves 71, 72 are inserted configure a tubular body KT with high bending rigidity and high compression rigidity. As a result, deformation of the tubular body KT when a force is applied to the headrest ST3 is minimized.

Moreover, the collars 61, 62 are attached between the upper wall part 5a and the lower wall part 5c of the upper panel 5 without a gap or with a slight gap.

This well restricts the deformation of a rear end part 5a4 of the upper wall part 5a and a rear end part 5c4 of the lower wall part 5c approaching in the up and down directions.

Moreover, the direction of the force received by the collars 61, 62 in the restriction is almost axial (compression directions), and thus the approaching of the upper wall part 5a and the lower wall part 5c in the up and down directions is prevented with higher strength.

Since the collars 61, 62 are tubular and not plate-like, a space Va open to the rear between the upper wall part 5a and the lower wall part 5c is left enough. This enables the seat ST even with the collars 61, 62 to accommodate various units in the space Va, such as an image display device.

As described above, in the headrest support structure HK and the seat ST provided with the same, the deformation is restricted by the collars 61, 62 with high rigidity interposed between the upper wall part 5a and the lower wall part 5c when the headrest ST3 receives a rearward force and the upper wall part 5a is to be bent and deformed downward (in a direction approaching the lower wall part 5c).

Moreover, the collars 61, 62 have the sleeves 71, 72 inserted therethrough to form the tubular body KT with higher rigidity.

The deformation of the upper panel 5 is more highly restricted, and thus the upper panel 5 keeps its original shape.

As described above, in the seat ST, the deformation of the support portion HS itself is well restricted when a rearward force is applied to the headrest ST3. In particular, the rod-shaped leg portions 81, 82 of the headrest ST3 are hard to tilt since the distance between the upper wall part 5*a* and the lower wall part 5*c* is maintained. As a result, the headrest ST3 does not tilt rearward greatly.

The present invention is not limited to the embodiment described above, and can be variously modified without departing from the essence of the present invention.

The collars 61, 62 may be fixed to the upper panel 5 or may not be fixed as described above.

As shown in FIG. 4, the collars 61, 62 restrict the approaching deformation of the rear end part 5*a*4 of the upper wall part 5*a* and the rear end part 5*c*4 of the lower wall part 5*c*. Accordingly, the collars 61, 62 may not be in surface contact with the bottom surface 5*a*3 of the upper wall part 5*a* and the top surface 5*c*3 of the lower wall part 5*c* and may be in point contact with the bottom surface 5*a*3 of the upper wall part 5*a* and the top surface 5*c*3 of the lower wall part 5*c*.

The shapes of the collars 61, 62 and the shapes of the base parts 71*a*, 72*a* of the sleeves 71, 72 may not be in a circular tubular shape as shown in FIGS. 2 and 3 and may be in various modes including a rectangular tubular shape and an elliptical tubular shape.

The seatback frame 1 may not be entirely configured as a frame. For example, the upper part may be the above-described panel-like upper panel 5 and the other parts may be a pipe-like frame.

The invention claimed is:

1. A headrest support structure comprising:

an upper panel extending in a width direction of a seatback frame at an upper part of the seatback frame, the upper panel comprising a sleeve support part comprising an upper wall part and a lower wall part facing each other in a direction perpendicular to the width direction, the sleeve support part being formed in a U-shape open to a side opposite to a seating side in a longitudinal sectional shape, the upper wall part having an upper hole formed therein, the lower wall part having a lower hole formed therein at a position corresponding to the upper hole;

a collar in a tubular shape with a through hole, the collar being arranged between the upper wall part and the lower wall part without being fixed to the sleeve support part to have the through hole communicate with the upper hole and the lower hole; and a sleeve in which a leg portion of a headrest is insertable, the sleeve being inserted through the upper hole, the through hole, and the lower hole from above, wherein the collar has a top end surface thereof abut on or face closely to a bottom surface of the upper wall part and has a bottom end surface thereof abut on or face closely to a top surface of the lower wall part.

2. A vehicle seat comprising a cushion seat, a seatback with a seatback frame and a headrest support structure, and a headrest mounted on the headrest support structure, the headrest support structure comprising:

an upper panel extending in a width direction of the seatback frame at an upper part of the seatback frame, the upper panel comprising a sleeve support part comprising an upper wall part and a lower wall part facing each other in a direction perpendicular to the width direction, the sleeve support part being formed in a U-shape open to a side opposite to a seating side in a longitudinal sectional shape, the upper wall part having an upper hole formed therein, the lower wall part having a lower hole formed therein at a position corresponding to the upper hole;

a collar in a tubular shape with a through hole, the collar being arranged between the upper wall part and the lower wall part without being fixed to the sleeve support part to have the through hole communicate with the upper hole and the lower hole; and a sleeve in which a leg portion of the headrest is insertable, the sleeve being inserted through the upper hole, the through hole, and the lower hole from above, wherein the collar has a top end surface thereof abut on or face closely to a bottom surface of the upper wall part and has a bottom end surface thereof abut on or face closely to a top surface of the lower wall part.

\* \* \* \* \*